Oct. 13, 1931.  W. H. PEARCE  1,826,896
RECORDING CHART SUPPORT
Filed Nov. 5, 1926
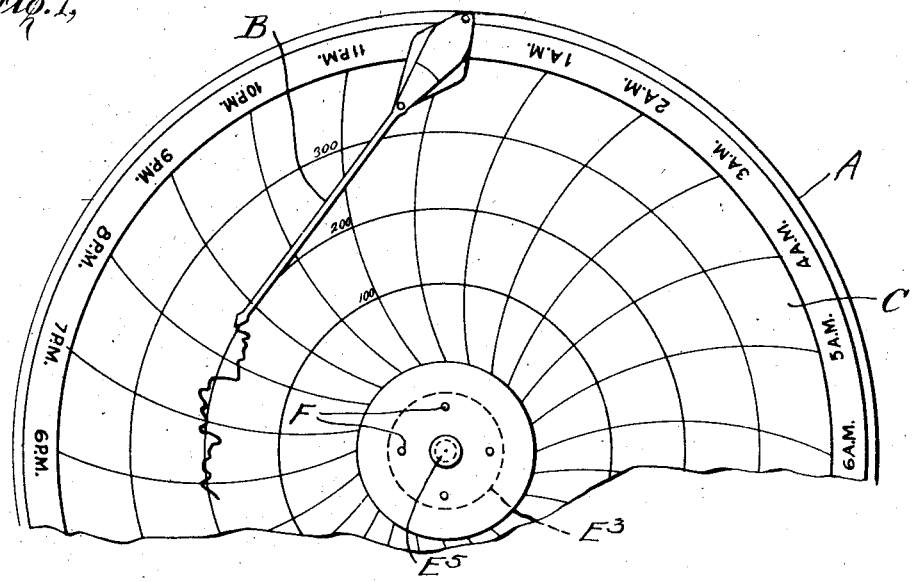
Fig. 1,
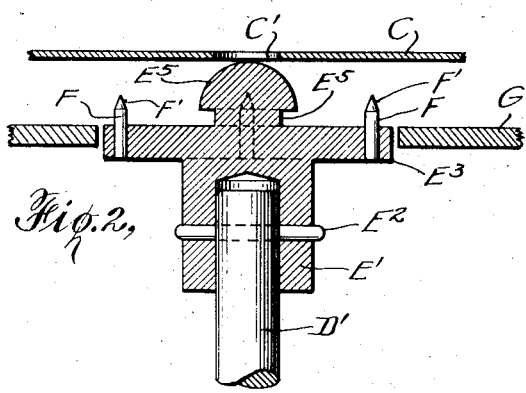
Fig. 2,
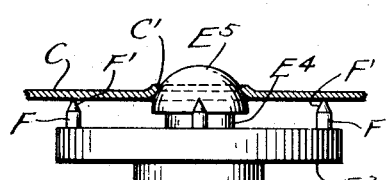
Fig. 3,
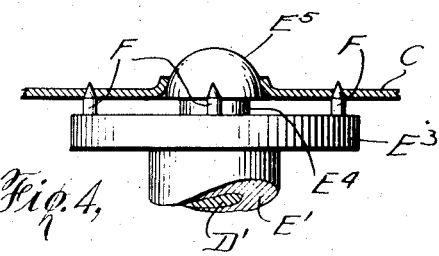
Fig. 4,
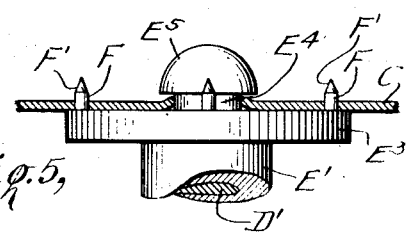
Fig. 5,
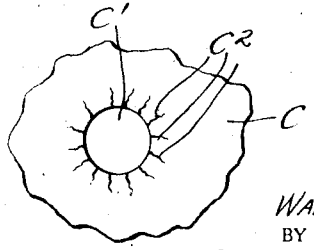
Fig. 6,
INVENTOR
WALTER H. PEARCE
BY
John E. Hubbell
ATTORNEY Patented Oct. 13, 1931

1,826,896

UNITED STATES PATENT OFFICE

WALTER H. PEARCE, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

RECORDING CHART SUPPORT

Application filed November 5, 1926. Serial No. 146,422.

My present invention relates to recording instruments of the type in which the record chart is a disc rotated by suitable time controlled mechanism; and the general object of my present invention is to provide improved means for detachably securing the record disc to the member by which it is rotated. More specifically, the object of the present invention is to provide a rotating chart support with simple chart centering and holding portions which will permit the chart to be readily and effectively secured to the support in the proper position relative to the latter, and which will permit the ready removal of the chart from said support without requiring relative movement of the chart engaging provisions which may form rigidly connecting parts of the rotating chart support.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is a front elevation;

Fig. 2 is a side elevation in section illustrating one stage in the operation of mounting a chart;

Figs. 3 and 4 are views taken similarly to Fig. 2 illustrating successive stages in the chart mounting operation;

Fig. 5 is a view taken similarly to Fig. 2 in its normal position on the chart support; and Fig. 6 is a plan view of the central portion of a chart after remvoal.

In the drawings, A designates a recording instrument of the usual type used in recording variations in temperatures or pressures, in which a pen or other marking element B moving in response to variations in the value of the quantity measured, records such variations on a paper disc chart C secured to a chart support rotated by a suitable timing mechanism.

The driving mechanism may comprise any usual or suitable form of motor, (not shown) for continuously rotating at the proper speed the shaft D' which carries the chart support. The latter, as shown, is a disc-like body with a rear sleeve portion E' surrounding the shaft D' and rigidly secured thereto by a pin $E^2$. Projecting from the front face $E^3$ of the body of the member E is a post $E^4$ which is rigidly connected to and may be integral with the body portion of the support and is co-axial with the shaft D'. The post $E^4$ comprises a cylindrical body or shank portion and an enlarged head or button portion $E^5$. The outer end of the head $E^5$ is rounded or tapered to facilitate its entrance in the central aperture C' of the chart disc C when the latter is formed with such an aperture and is put in place as hereinafter described. The support is provided with one, or, preferably as shown, a plurality of pins F projecting outwardly from the face $E^3$ at some radial distance from the post $E^4$. The pins F have pointed ends F' and puncture the chart disc C when the latter is put in place on the support E. As shown, a stationary chart supporting plate G secured to the instrument casing A is formed with an aperture receiving the support and has its front face in substantially the same plane as the support.

In mounting the chart C on the chart support the chart is centered by entering the rounded or tapered end of the enlarged head $E^5$ in the aperture C' and thereafter the chart is moved inward until its central portion engages the face $E^3$ as shown in Fig. 5. Figs. 2, 3, and 4 illustrate different relative positions of the support and chart as the latter is being put in place. Before the chart is punctured by the pins F, it is adjusted angularly about the axis of the support, as required to bring the chart into the position in which the marking element B and the usual time interval lines on the chart are in the proper time relation.

The chart opening C' is initially smaller in diameter than the enlarged post head $E^5$, and in practice the opening C' may advantageously be slightly smaller in diameter than the body of the post E⁴. With such relative proportion the chart opening C' is necessarily enlarged when the chart is forced on the post E⁴. If, as I consider desirable in some cases, the maximum diameter of the post head E⁵ does not too greatly exceed the initial diameter of the chart opening C', the necessary enlargement of the latter may result in merely stretching the chart material at the margin of the chart opening. When, however, the maximum diameter of the head E⁵ of the post E⁴ is much larger than the initial diameter of the chart opening C', the chart material will break or tear along short lines C² generally radial to the axis of the hole C', unless the chart is initially formed as it may be with cuts projecting radially outward from the margin of the opening C' along the lines generally similar to the lines C² so as to form the chart initially with resilient tongues which bend outward when the chart is pushed home over the post E⁴.

In any event, when the chart C is mounted on the chart support with the body of the chart at the margin of the opening C' bearing against the front face of the disc-like portion E³ of the chart support, the enlarged head portion E⁵ overhangs the portion of the chart at the margin of the opening C', and if, as I consider preferable in all cases, the initial diameter of the opening C' is less than the diameter of the shank portion of the post, the portion of the chart material immediately adjacent the post will be outturned as shown in Fig. 5, and will be in more or less snug frictional engagement with the shank of the post E⁴. In consequence, the chart will not only be held against accidental removal from the chart support but will be accurately centered on the latter, and the chart may be readily removed when chart replacement is necessary without subjecting the chart to undue force. The pin, or pins, F, form an effective driving connection between the chart and the chart support E, and the fact that the openings in the chart receiving the pins F are formed by the latter when the chart is put in place, contributes to a desirable rigidity, so as to speak, in the connection between the chart and the chart support. The pin or pins F also tend to prevent any unsymmetrical enlargement of the opening C' in the chart C, when the latter is forced over the head E⁵, and thus contribute to the accurate centering of the chart in its working position.

The chart securing provisions illustrated and described are simple and effective and form a satisfactory solution of a problem which has led to the development and extensive use of the so-called non-removable chart knobs to avoid the inconvenience resulting from the frequent loss of chart knobs experienced with the still earlier type of construction in which the chart is removably secured in place by a removable knob in threaded engagement with the rotating chart support. The so-called non-removable chart knobs are complicated and relatively expensive in construction. An additional advantage of the invention arises from the relatively short distance which the knob projects outwardly from the face E³. A reduction in this distance obviously tends to compactness and is especially important when the invention is used in a combined indicating and recording instrument comprising an index hand swinging across the axis of the rotating chart support. The distinguishing characteristic of the present invention is that the chart penetrating post, including its body portion and its enlarged head E⁵, is in operatively fixed relation with the chart driving member. In describing the post here and in the appended claims as in operatively fixed relation with the chart driving member, I mean to distinguish from the chart supporting and driving constructions of the prior art in which the post includes or has detachably secured thereto a clamping part which is movable relative to another portion or portions of the chart supporting and driving means to secure a chart in place and to permit the latter to be removed.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. In recording apparatus, chart holding and rotating means comprising a rotatable driving member having a body portion and having an outer end portion in operatively fixed relation thereto and connected to said body portion by a shank smaller in diameter than said end portion whereby when said end portion is forced through a chart aperture snugly receiving said shank said chart will have its front side overhung at the margin of said opening by said end portion, and one or more chart penetrating portions of a length intermediate those of the post and its shank portion projecting from said body portion alongside said post.

2. In recording apparatus, chart holding and rotating means comprising a rotatable driving member having a body portion and a chart penetrating post projecting from said body portion and in operatively fixed relation thereto and having an outer end portion connected to said body portion by a shank smaller in diameter than said end portion whereby when said post is forced through a chart aperture snugly receiving said shank said chart will have its front side overhung at the margin of said opening by said end portion, and one or more pointed chart puncturing parts projecting from said body portion at some radial distance from said post and of a length to engage and penetrate said chart when the latter is forced over said post.

3. In recording apparatus, chart holding and rotating means comprising a rotatable driving member having a body portion secured thereto and a chart penetrating post member projecting from said body portion and in operatively fixed relation thereto and larger in diameter than the central aperture of a chart adapted to be centered thereon and pin members shorter than said post secured to said body portion near the post and arranged to assist in centering and connecting said chart to said body portion for rotation therewith.

4. In recording apparatus, chart holding and rotating means comprising a rotatable driving member having a body portion secured thereto, a chart penetrating post member projecting from said body portion and in operatively fixed relation thereto and larger in diameter than the central aperture of a chart adapted to be centered thereon, and chart penetrating pin members secured to said body portion and of a length adapted to aid in centering and connecting said chart to said body portion for rotation therewith, and one of said members having an undercut outer end portion.

5. In recording apparatus, chart holding and rotating means comprising a rotatable driving member having a body portion secured thereto, a stationary chart supporting plate surrounding said body portion, a chart centering post projecting from said body portion and in operatively fixed relation thereto and having a diameter not less than that of the central aperture of a chart adapted to be centered thereon and a plurality of pins mounted on said body member about said post and of a length to engage and penetrate a chart centered on said post and cause said chart to rotate with said body portion.

Signed at Philadelphia, in the county of Philadelphia and State of Pennsylvania, this 3d day of November, A. D. 1926.

WALTER H. PEARCE.